(12) United States Patent
Lakaniemi

(10) Patent No.: US 7,680,099 B2
(45) Date of Patent: Mar. 16, 2010

(54) JITTER BUFFER ADJUSTMENT

(75) Inventor: Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 739 days.

(21) Appl. No.: 11/508,562

(22) Filed: Aug. 22, 2006

(65) Prior Publication Data

US 2008/0049795 A1 Feb. 28, 2008

(51) Int. Cl.
*H04L 12/66* (2006.01)
(52) U.S. Cl. .......................... 370/352; 370/516
(58) Field of Classification Search ............... None
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,512,761 B1 | 1/2003 | Schuster et al. | |
| 6,735,192 B1 | 5/2004 | Fried et al. | |
| 6,882,711 B1 | 4/2005 | Nicol | |
| 2002/0057686 A1 * | 5/2002 | Leon | 370/389 |
| 2006/0056383 A1 | 3/2006 | Black et al. | |
| 2006/0077994 A1 * | 4/2006 | Spindola et al. | 370/412 |

OTHER PUBLICATIONS

Moon et al, Packet audio playout delay adjustment: performance bounds and algorithms, Multimedia Systems, 12 pages, 1998.*
"RTP: A Transport Protocol for Real-Time Applications;" H. Schulzrinne et al; RFC3550; Jul. 2003.

* cited by examiner

*Primary Examiner*—Frank Duong
(74) *Attorney, Agent, or Firm*—Alfred A. Fressola; Ware, Fressola, Van Der Sluys & Adolphson LLP

(57) ABSTRACT

For enhancing the performance of an adaptive jitter buffer, a desired amount of adjustment of a jitter buffer is determined at a first device using as a parameter an estimated delay. The delay comprises at least an end-to-end delay in at least one direction in a conversation. For this conversation, speech signals are transmitted in packets between the first device and a second device via a packet switched network. An adjustment of the jitter buffer is then performed based on the determined amount of adjustment.

59 Claims, 5 Drawing Sheets

JITTER BUFFER ADJUSTMENT

FIELD OF THE INVENTION

The invention relates to a jitter buffer adjustment.

BACKGROUND OF THE INVENTION

For a transmission of voice, speech frames may be encoded at a transmitter, transmitted via a network, and decoded again at a receiver for presentation to a user.

During periods when the transmitter has no active speech to transmit, the normal transmission of speech frames may be switched off. This is referred to as discontinuous transmission (DTX) mechanism. Discontinuous transmission saves transmission resources when there is no useful information to be transmitted. In a normal conversation, for instance, usually only one of the involved persons is talking at a time, implying that on an average, the signal in one direction contains active speech only during roughly 50% of the time. The transmitter may generate during these periods a set of comfort noise parameters describing the background noise that is present at the transmitter. These comfort noise parameters may be sent to the receiver. The transmission of comfort noise parameters usually takes place at a reduced bit-rate and/or at a reduced transmission interval compared to the speech frames. The receiver may then use the received comfort noise parameters to synthesize an artificial, noise-like signal having characteristics close to those of the background noise present at the transmitter.

In the Adaptive Multi-Rate (AMR) speech codec and the AMR Wideband (AMR-WB) speech codec, for example, a new speech frame is generated in 20 ms intervals during periods of active speech. Once the end of an active speech period is detected, the discontinuous transmission mechanism keeps the encoder in the active state for seven more frames to form a hangover period. This period is used at a receiving end to prepare a background noise estimate, which is to be used as a basis for the comfort noise generation during the non-speech period. After the hangover period, the transmission in switched to the comfort noise state, during which updated comfort noise parameters are transmitted in silence descriptor (SID) frames in 160 ms intervals. At the beginning of a new session, the transmitter is set to the active state. This implies that at least the first seven frames of a new session are encoded and transmitted as speech, even if the audio signal does not include speech.

Audio signals including speech frames and, in the case of DTX, comfort noise parameters may be transmitted from a transmitter to a receiver for instance via a packet switched network, such as the Internet.

The nature of packet switched communications typically introduces variations to the transmission times of the packets, known as jitter, which is seen by the receiver as packets arriving at irregular intervals. In addition to packet loss conditions, network jitter is a major hurdle especially for conversational speech services that are provided by means of packet switched networks.

More specifically, an audio playback component of an audio receiver operating in real-time requires a constant input to maintain a good sound quality. Even short interruptions should be prevented. Thus, if some packets comprising audio frames arrive only after the audio frames are needed for decoding and further processing, those packets and the included audio frames are considered as lost due to a too late arrival. The audio decoder will perform error concealment to compensate for the audio signal carried in the lost frames. Obviously, extensive error concealment will reduce the sound quality as well, though.

Typically, a jitter buffer is therefore utilized to hide the irregular packet arrival times and to provide a continuous input to the decoder and a subsequent audio playback component. The jitter buffer stores to this end incoming audio frames for a predetermined amount of time. This time may be specified for instance upon reception of the first packet of a packet stream. A jitter buffer introduces, however, an additional delay component, since the received packets are stored before further processing. This increases the end-to-end delay. A jitter buffer can be characterized for example by the average buffering delay and the resulting proportion of delayed frames among all received frames.

A jitter buffer using a fixed playback timing is inevitably a compromise between a low end-to-end delay and a low amount of delayed frames, and finding an optimal tradeoff is not an easy task. Although there can be special environments and applications where the amount of expected jitter can be estimated to remain within predetermined limits, in general the jitter can vary from zero to hundreds of milliseconds—even within the same session. Using a fixed playback timing with the initial buffering delay that is set to a sufficiently large value to cover the jitter according to an expected worst case scenario would keep the amount of delayed frames in control, but at the same time there is a risk of introducing an end-to-end delay that is too long to enable a natural conversation. Therefore, applying a fixed buffering is not the optimal choice in most audio transmission applications operating over a packet switched network.

An adaptive jitter buffer management can be used for dynamically controlling the balance between a sufficiently short delay and a sufficiently low amount of delayed frames. In this approach, the incoming packet stream is monitored constantly, and the buffering delay is adjusted according to observed changes in the delay behavior of the incoming packet stream. In case the transmission delay seems to increase or the jitter is getting worse, the buffering delay is increased to meet the network conditions. In an opposite situation, the buffering delay can be reduced, and hence, the overall end-to-end delay is minimized.

SUMMARY

The invention proceeds from the consideration that the control of the end-to-end delay is one of the challenges in adaptive jitter buffer management. In a typical case, the receiver does not have any information on the end-to-end delay. Therefore, the adaptive jitter buffer management typically performs adjustment solely by trying to keep the amount of delayed frames below a desired threshold value. While this approach can be used to keep the speech quality at an acceptable level over a wide range of transmission conditions, the adjustment may increase the end-to-end delay above acceptable level in some cases, and thus render a natural conversation impossible.

A method is proposed, which comprises determining at a first device a desired amount of adjustment of a jitter buffer using as a parameter an estimated delay, the delay comprising at least an end-to-end delay in at least one direction in a conversation. For the conversation, speech signals are transmitted in packets between the first device and a second device via a packet switched network. The method further comprises performing an adjustment of the jitter buffer based on the determined amount of adjustment.

Moreover, an apparatus is proposed, which comprises a control component configured to determine at a first device a desired amount of adjustment of a jitter buffer, using as a parameter an estimated delay, the delay comprising at least an end-to-end delay in at least one direction in a conversation. For this conversation, speech signals are transmitted again in packets between the first device and a second device via a packet switched network. The apparatus further comprises an adjustment component configured to perform an adjustment of the jitter buffer based on the determined amount of adjustment.

The control component and the adjustment component may be implemented in hardware and/or software. The apparatus could be for instance an audio receiver, an audio transceiver, etc. It could further be realized for example in the form of a chip or in the form of a more comprehensive device, etc.

Moreover, an electronic device is proposed, which comprises the proposed apparatus and in addition an audio input component, like a microphone, and an audio output component, like speakers.

Moreover, a system is proposed, which comprises the proposed electronic device and in addition a further electronic device. The further electronic device is configured to exchange speech signals for a conversation with the first electronic device via a packet switched network.

Finally, a computer program product is proposed, in which a program code is stored in a computer readable medium. The program code realizes the proposed method when executed by a processor.

The computer program product could be for example a separate memory device, or a memory that is to be integrated in an electronic device, etc.

The invention is to be understood to cover such a computer program code also independently from a computer program product and a computer readable medium.

By considering the end-to-end delay in at least one direction in adjusting the jitter buffer, the adaptive jitter buffer performance can be improved. If the end-to-end delay in at least one direction is considered for instance in addition to the amount of frames, which arrive after their scheduled decoding time, the optimal trade-off between these two aspects can be found. Frames arriving after their scheduled decoding time are typically dropped by the buffer, because the decoder has already replaced them due to their late arriving by using error concealment. From the decoder's point of view, these frames can thus be considered as lost frames. The amount of such frames will therefore also be referred to as late loss rate.

The considered estimated delay may be for example an estimated unidirectional end-to-end delay or an estimated bi-directional end-to-end delay. The unidirectional end-to-end delay may be for instance the delay between the time at which a user of one device starts talking and the time at which the user of the other device starts hearing the speech. The bi-directional end-to-end delay will be referred to as response time in the following.

In a conversational situation, the interactivity of the conversation might be considered to be a still more important aspect from a user's point of view than the unidirectional end-to-end delay. A measure for the interactivity is the response time, which is experienced by a user who has stopped talking and is waiting to hear a response and which may thus include in addition to transmission and processing delays in both directions the reaction time of a user. For one embodiment, it is therefore proposed that an estimated response time is used as a specific estimated delay for selecting the most suitable adjustment of an adaptive jitter buffer. The estimated response time may be for example a time between an end of a segment of speech originating from a user of the first device and a beginning of a presentation by the first device of a segment of speech originating from a user of the second device.

In one embodiment of the invention, determining an amount of adjustment comprises determining the amount such that an amount of frames arriving after their scheduled decoding time is kept below a first limit, as long as the estimated delay lies below a first threshold value. In addition, the amount of adjustment is determined such that an amount of frames arriving after their scheduled decoding time is kept below a second limit, when the estimated delay lies above the first threshold value, for example between the first threshold value and a second, higher threshold value.

The first threshold value, the second threshold value, the first limit and the second limit may be predetermined values. Alternatively, however, one or more of the values may be flexible. The second limit could be computed for example as a function of the estimated delay. With an estimated longer delay, a higher second limit could be used. The idea is that when the delay grows higher, leading to decreased interactivity, a higher late loss rate could be allowed to avoid increasing the delay even further by increasing the buffering time to keep the late loss rate low.

The delay can be estimated using any available mechanism. The estimation may be based on available information or on dedicated measurements.

For example, an external time reference based approach could be used, like the Network Time Protocol (NTP) based approach described for the Real-Time Transport Protocol (RTP)/Real-Time Control Protocol (RTCP) in RFC 3550: "RTP: A Transport Protocol for Real-Time Applications", July 2003, by H. Schulzrinne et al.

If an estimated response time is to be used as an estimated delay, the response time could also be estimated roughly taking account of the general structure of a conversation. A conversation is usually divided into conversational turns, during which one party is speaking and the other party is listening. This structure of conversation can be exploited to estimate the response time.

The response time could thus be estimated as a period between a time when a user of the first device is detected at the first device to switch from speaking to listening, and a time when a user of the second device is detected at the first device to switch from listening to speaking.

An electronic device will usually know its own transmission and reception status, and this knowledge may be used for estimating these changes of behavior as a basis for the response time.

The estimated time when a user of the second device is detected to switch from listening to speaking could be for instance the time when the first device receives via the packet switched network a first segment of a speech signal containing active speech after having received at least one segment of the speech signal not containing active speech. A decoder of the first device could provide to this end for example an indication of the current type of content of the received speech signal, an indication of the presence of a particular type of content, or an indication of a change of content. The type of content represents the current reception status of the first device and thus the current transmission status of the second device. A reception of comfort noise frames indicates for example that the user of the second device is listening, while a reception of speech frames indicates that the user of the second device is speaking.

The estimated time when a user of the first device is detected to switch from speaking to listening could be a time when the first device starts generating comfort noise parameters. An encoder of the first device could provide a corresponding indication.

Alternatively, if the electronic device employs voice activity detection (VAD), the estimated time when a user of the first device is detected to switch from speaking to listening could be a time when a VAD component of the first device sets a flag to a value indicating that a current segment of a speech signal that is to be transmitted via the packet switched network does not contain voice. A VAD component of the first device could provide a corresponding indication. If a DTX hangover period is used, a flag set by a VAD component may provide faster and more accurate information about the end of a speech segment than an indication that comfort noise is generated.

In the case of Voice over IP (VoIP), for example, a VoIP client could know its own transmission status based on the current results of a voice activity detection and on the state of discontinuous transmission operations.

It has to be noted that the presented option of roughly estimating a response time could also be used for other purposes than for controlling an adaptive jitter buffer. Further, it is a useful additional quality of service metric.

The invention can be employed for any application using an adaptive jitter buffer for speech signals. An example is VoIP using an AMR or AMR-WB codec.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
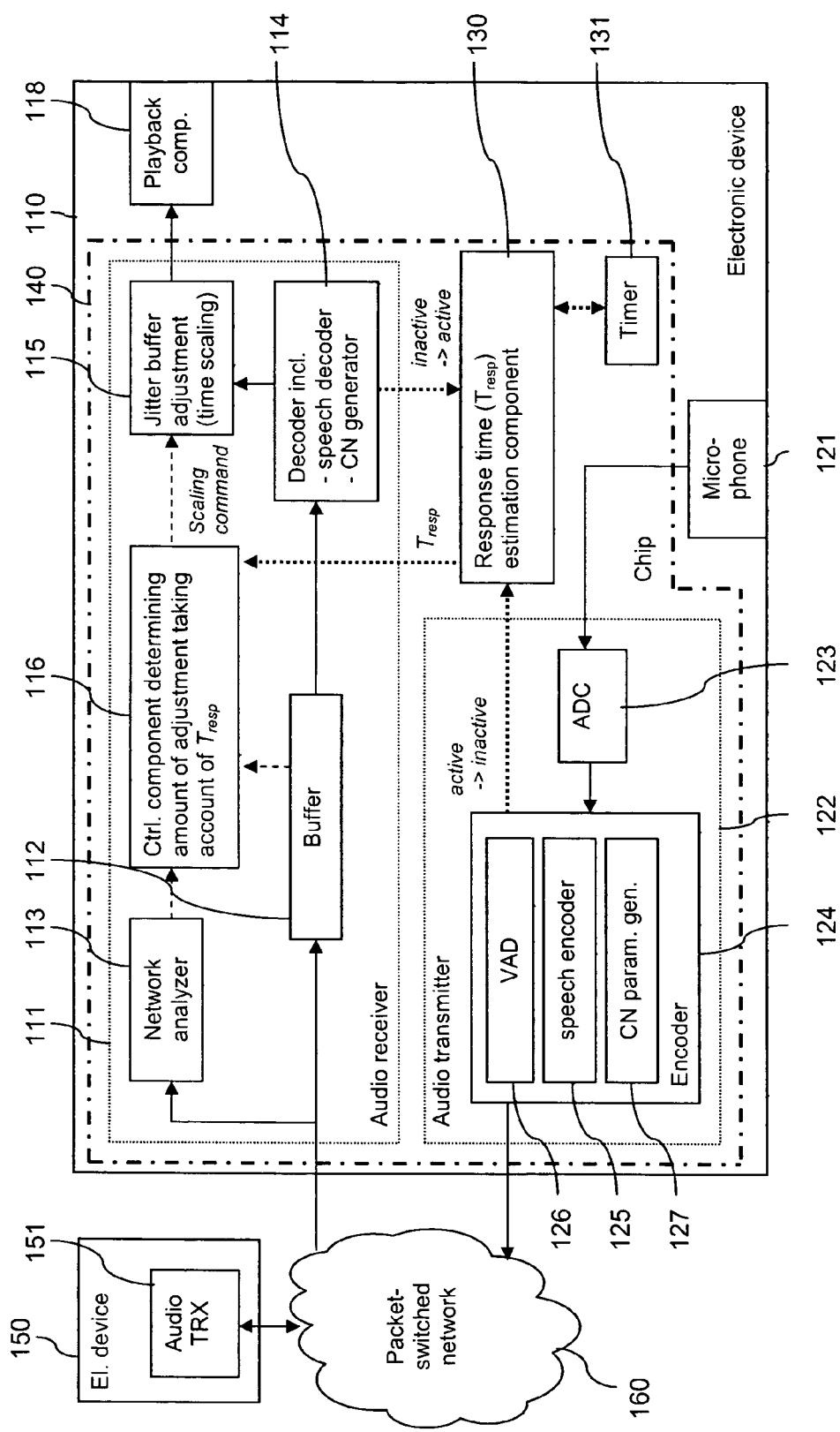
FIG. 1 is a schematic block diagram of a system according to an embodiment of the invention.

FIG. 1 is a schematic block diagram of an exemplary system, which enables an adjustment of an adaptive jitter buffering based on an estimated response time in accordance with an embodiment of the invention.

The system comprises a first electronic device 110, a second electronic device 150 and a packet switched communication network 160 interconnecting both devices 110, 150. The packet switched communication network 160 can be or comprise for example the Internet.

Electronic device 110 comprises an audio receiver 111, a playback component 118 linked to the output of the audio receiver 111, an audio transmitter 122, a microphone 121 linked to the input of the audio transmitter 122, and a response time ($T_{resp}$) estimation component 130, which is linked to both, audio receiver 111 and audio transmitter 122. The $T_{resp}$ estimation component 130 is further connected to a timer 131. An interface of the device 110 to the packet switched communication network 160 (not shown) is linked within the electronic device 110 to an input of the audio receiver 111 and to an output of the audio transmitter 122.

The audio receiver 111, the audio transmitter 122, the $T_{resp}$ estimation component 130 and the timer 131 could be implemented for example in a single chip 140 or in a chipset.

The input of the audio receiver 111 is connected within the audio receiver 111 on the one hand to a jitter buffer 112 and on the other hand to a network analyzer 113. The jitter buffer 112 is connected via a decoder 114 and an adjustment component 115 to the output of the audio receiver 111 and thus to the playback component 118. A control signal output of the network analyzer 113 is connected to a first control input of a control component 116, while a control signal output of the jitter buffer 112 is connected to a second control input of the control component 116. A control signal output of the control component 116 is further connected to a control input of the adjustment component 115.

The playback component 118 may comprise for example loudspeakers.

The input of the audio transmitter 122 of electronic device 110 is connected within the audio receiver 122 via an analog-to-digital converter (ADC) 123 to an encoder 124. The encoder 124 may comprise for example a speech encoder 125, a voice activity detection (VAD) component 126 and a comfort noise parameter generator 127.

The $T_{resp}$ estimation component 130 is arranged to receive an input from the decoder 114 and from the encoder 124. An output of the $T_{resp}$ estimation component 130 is connected to the control component 116.

Electronic device 110 can be considered to represent an exemplary embodiment of an electronic device according to the invention, while chip 140 can be considered to represent an exemplary embodiment of an apparatus of the invention.

It is to be understood that various components of electronic device 110 within and outside of the audio receiver 111 and the audio transmitter 122 are not depicted, and that any indicated link could equally be a link via further components not shown. The electronic device 110 comprises in addition for instance the above mentioned interface to the network 160. In addition, it could comprise for the transmitting chain a separate discontinuous transmission control component, a channel encoder and a packetizer. Further, it could comprise for the receiving chain a depacketizer, a channel decoder and a digital to analog converter, etc. Moreover, audio receiver 111 and audio transmitter 122 could be realized as well in the form of an integrated transceiver. Further, the $T_{resp}$ estimation component 130 and the timer 131 could be integrated as well in the audio receiver 111, in the audio transmitter 122 or in an audio transceiver.

Electronic device 150 could be implemented in the same way as electronic device 110, even though this is not mandatory. It should be configured, though, to receive and transmit audio packets in a discontinuous transmission via the network 160 using a codec that is compatible with the codec employed by electronic device 110. For illustrating these transceiving capabilities, electronic device 150 is shown to comprise an audio transceiver (TRX) 151.

The coding and decoding of audio signals in the electronic devices 110, 150 may be based for example on the AMR codec or the AMR-WB codec.

Electronic device 110 and electronic device 150 may be used by a respective user for a VoIP conversation via the packet switched communication network 160.

During an ongoing VoIP session, the microphone 121 registers audio signals in the environment of electronic device 110, in particular speech uttered by user A. The microphone 121 forwards the registered analog audio signal to the audio transmitter 122. In the audio transmitter 122, the analog audio signal is converted by the ADC 123 into a digital signal and provided to the encoder 124. In the encoder 124, the VAD component 126 detects whether the current audio signal comprises active voice. It sets a VAD flag to '1', in case active voice is detected and it sets the VAD flag to '0', in case no active voice is detected. If the VAD flag is set to '1', the speech encoder 125 encodes a current audio frame as an active speech frame. Otherwise, the comfort noise parameter generator 127 generates SID frames. The SID frames comprise 35 bits of comfort noise parameters describing the background noise at the transmitting end while no active speech is present. The active speech frames and the SID frames are then channel encoded, packetized and transmitted via the packet switched communication network 160 to the electronic device 150. Active speech frames are transmitted at 20 ms intervals, while SID frames are transmitted at 160 ms intervals.

In electronic device 150, the audio transceiver 151 processes the received packets in order to be able to present a corresponding reconstructed audio signal to user B. Further, the audio transceiver 151 processes audio signals that are registered in the environment of electronic device 150, in particular speech uttered by user B, in a similar manner as the audio transmitter 122 processes audio signals that are registered in the environment of electronic device 110. The resulting packets are transmitted via the packet switched communication network 160 to the electronic device 110.

The electronic device 110 receives the packets, depacketizes them and channel decodes the contained audio frames.

The jitter buffer 112 is then used to store the received audio frames while they are waiting for decoding and playback. The jitter buffer 112 may have the capability to arrange received frames into the correct decoding order and to provide the arranged frames—or information about missing frames—in sequence to the decoder 114 upon request. In addition, the jitter buffer 112 provides information about its status to the control component 116. The network analyzer 113 computes a set of parameters describing the current reception characteristics based on frame reception statistics and the timing of received frames and provides the set of parameters to the control component 116. Based on the received information, the control component 116 determines the need for a changing buffering delay and gives corresponding time scaling commands to the adjustment component 115. Generally, the optimal average buffering delay is the one that minimizes the buffering time without any frames arriving late at the decoder 114, that is after their scheduled decoding time. The control component 116, however, is supplemented according to the invention to take into account in addition information received from the $T_{resp}$ estimation component 130, as will be described further below.

The decoder 114 retrieves an audio frame from the buffer 112 whenever new data is requested by the playback component 118. It decodes the retrieved audio frames and forwards the decoded frames to the adjustment component 115. When an encoded speech frame is received, it is decoded to obtain a decoded speech frame. When an SID frame is received, comfort noise is generated based on the included comfort noise parameters and distributed to a sequence of comfort noise frames forming decoded frames. The adjustment component 115 performs a scaling commanded by the control component 116, that is, it may lengthen or shorten the received decoded frames. The decoded and possibly time scaled frames are provided to the playback component 118 for presentation to user A.

Figure 2:
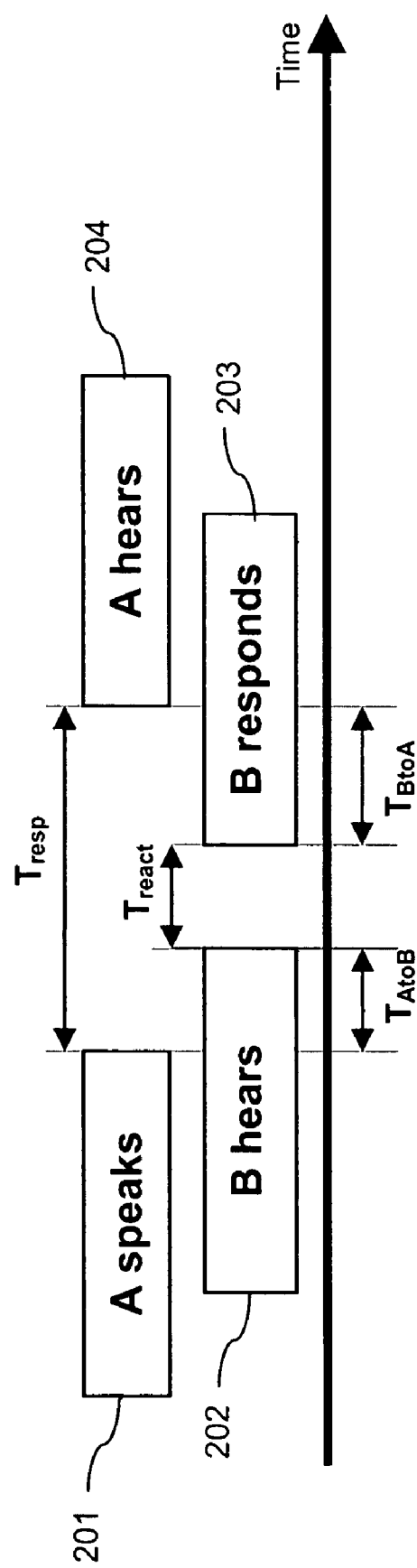
FIG. 2 is a diagram illustrating the structure of a conversation.

FIG. 2 is a diagram illustrating the structure of a conversation between user A and user B, the structure being based on the assumption that while user A of device 110 is speaking, user B of device 150 is listening, and vice versa.

When user A speaks (201), this is heard with a certain delay $T_{AtoB}$ by user B (202), $T_{AtoB}$ being the transmission time from user A to user B.

When user B notes that user A has terminated talking, user B will respond after reaction time $T_{react}$.

When user B speaks (203), this is heard with a certain delay $T_{BtoA}$ by user A (204), $T_{BtoA}$ being the transmission time from user B to user A.

The period user A experiences from the time when user A stops talking to the time when user A starts hearing speech from user B is referred to as response time $T_{reap}$ from user A to user B and back to user A. This response time $T_{reap}$ can be expressed by:

$$T_{resp} = T_{AtoB} + T_{react} + T_{BtoA}.$$

It should be noted that this is a simplified model for the full response time. For example, this model does not explicitly show the buffering delays and the algorithmic and processing delays in the employed speech processing components, but they are assumed to be included in the transmission times $T_{AtoB}$ and $T_{BtoA}$. While the buffering delay in the device of user A is an important part of the response time, this delay component is easily available in the device of user A. Beyond this, the relevant aspect is the two-way nature of the response time. It should also be noted that the response time is not necessarily symmetric. Due to different routing and/or link behavior, the response time A-B-A can be different from response time B-A-B. Furthermore, also the reaction time is likely to be different for user A and user B.

From a user's point of view, the interactivity of a conversation represented by the respective response time $T_{resp}$ is an important aspect. That is, the respective response time $T_{resp}$ should not become too large.

The $T_{resp}$ estimation component 130 of electronic device 110 is used for estimating the current response time $T_{resp}$.

Figure 3:
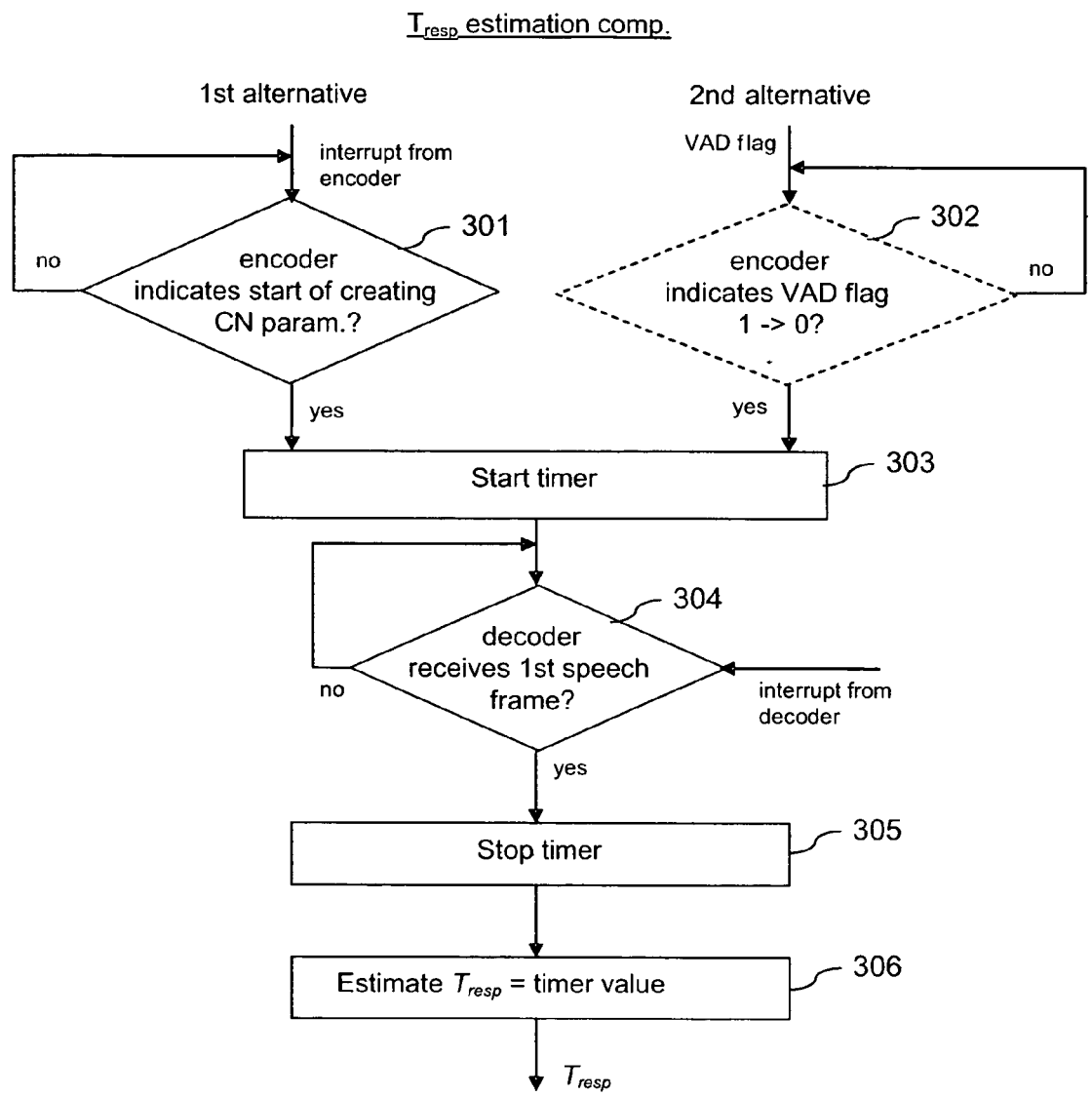
FIG. 3 is a flow chart illustrating an operation in the system of FIG. 1 for estimating a current response time in a conversation.

FIG. 3 is a flow chart illustrating an operation by the $T_{resp}$ estimation component 130 for determining the response time $T_{resp}$.

The encoder 124 is configured to provide an indication to the $T_{resp}$ estimation component 130, whenever the content of a received audio signal changes from active speech to background noise.

The encoder 124 could send a corresponding interrupt, whenever the comfort noise parameter generator 127 starts generating comfort noise parameters after a period of active speech, which indicates that user A has stopped talking.

In some codecs, like the AMR and AMR-WB codecs, however, the discontinuous transmission (DTX) mechanism uses a DTX hangover period. That is, it switches the encoding from speech mode to comfort noise mode only after seven frames without active speech following upon a speech burst have been encoded by the speech encoder 127. In this case, the change from "speaking" to "listening" could be detected earlier by monitoring the status of the VAD flag, which indicates the speech activity in the current frame.

The decoder 114 is configured to provide an indication to the $T_{resp}$ estimation component 130, whenever the decoder 114 receives a first frame with active speech after having received only frames with comfort noise parameters. Such a change indicates that user B has switched from "listening" to "speaking".

For determining the response time $T_{resp}$, the $T_{resp}$ estimation component 130 monitors whether it receives an interrupt from the encoder 124, which indicates the start of a creation of comfort noise parameters (step 301). Alternatively, the $T_{resp}$ estimation component 130 monitors whether a VAD flag provided by the VAD component 126 changes from '1' to '0', indicating the end of a speech burst (step 302). This alternative is indicated in FIG. 3 by dashed lines. Both alternatives are suited to inform the $T_{resp}$ estimation component 130 that user A switched from "speaking" to "listening".

If a creation of comfort noise parameters or the end of a speech burst is detected, the $T_{resp}$ estimation component 130 activates the timer 131 (step 303).

While the timer 131 counts the passing time starting from zero, the $T_{resp}$ estimation component 130 monitors whether it receives an indication from the decoder 114 that user B has switched from "listening" to "speaking" (step 304Y.

When such a switch is detected, the $T_{resp}$ estimation component 130 stops the timer 131 (step 305) and reads the counted time (step 306).

The counted time is provided as response time $T_{resp}$ to the control component 116.

The blocks of FIG. 3 could equally be viewed as sub-components of the $T_{resp}$ estimation component 130. That is, blocks 301 or 302 and block 304 could be viewed as detection components, while blocks 303, 305 and 306 could be viewed as timer access components, which are configured to perform the indicated functions.

The presented mechanism only provides a useful result, if both users A and B are talking alternately, not at the same time. Care might thus be taken to avoid a mess up of the estimation, for instance for the case that a response is given by one of the users before the other user has finalized his/her conversational turn. To this end, the decoder 114 might be configured in addition to indicate when it starts receiving frames for a new speech burst. The $T_{resp}$ estimation component 130 might then consider an indication that user A started listening in step 301 or 302 only, in case the last received information from the decoder 114 does not indicate that user B has already started speaking.

While the presented operation provides only a relatively rough estimate on the response time $T_{resp}$, it can still be considered useful information for an adaptive jitter buffer management. It has to be noted, though, that the response time $T_{resp}$ could also be estimated or measured in some other way, for example based on the approach described in above cited document RFC 3550.

Figure 4:
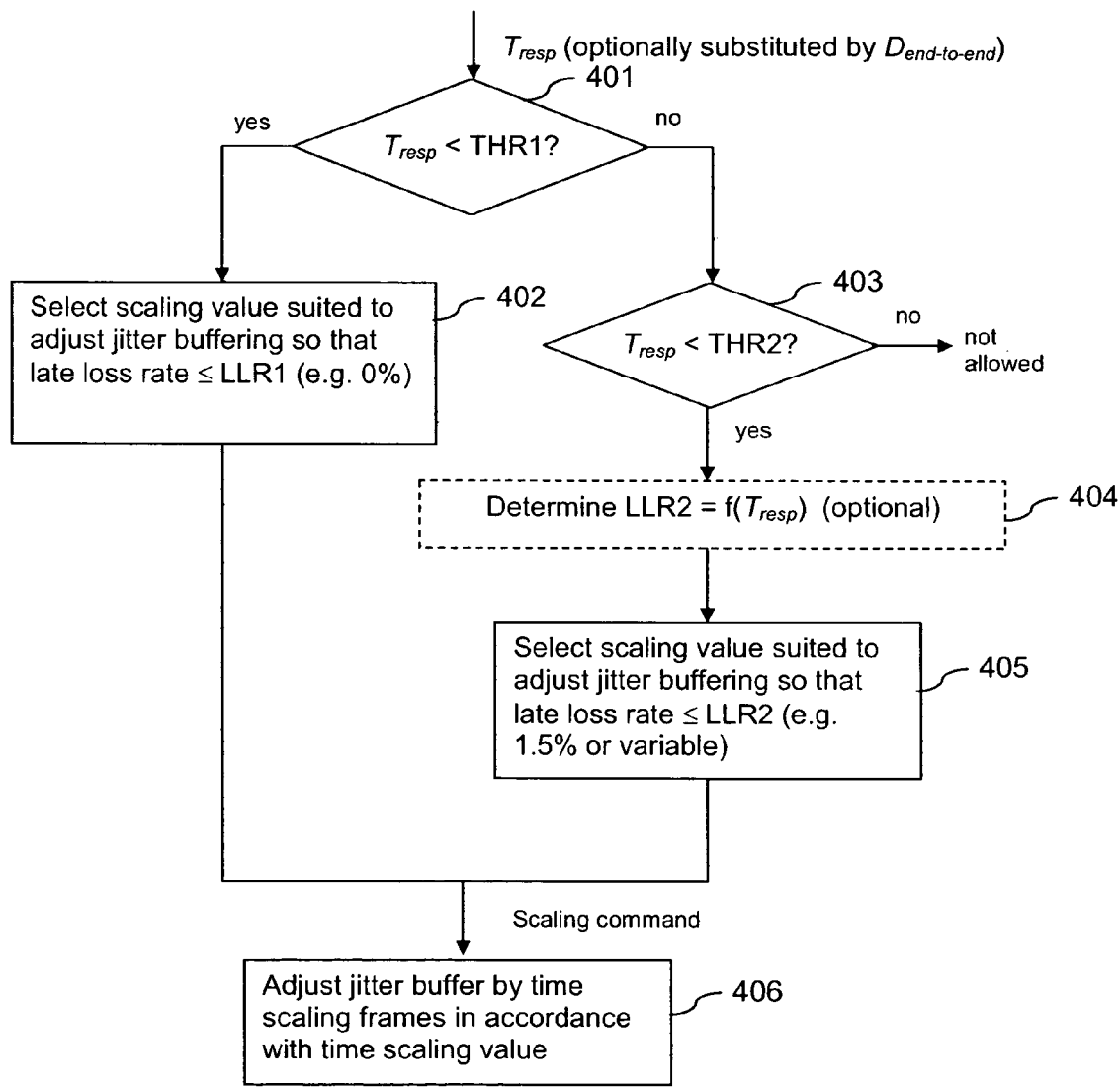
FIG. 4 is a flow chart illustrating an operation in the system of FIG. 1 for adjusting a jitter buffering based on a current response time.

FIG. 4 is a flow chart illustrating an operation by the control component 116 for adjusting the jitter buffering based on response time $T_{resp}$.

In the control component 116, a first, lower predetermined threshold value THR1 and a second, higher predetermined threshold value THR2 are set for the response time $T_{resp}$. In addition, a first, lower predetermined limit LLR1 and a second, higher predetermined limit LLR2 are set for the late loss rate (LLR) of the received frames. As indicated above, the late loss rate is the amount of frames arriving after their scheduled decoding time. That is, the late loss rate may correspond to the amount of frames which the playback component 118 requests from the decoder 114, but which the decoder 114 cannot retrieve from the buffer 112 due to their late arrival, and which are therefore considered as lost by the decoder 114 and typically replaced by error concealment.

According to ITU-T Recommendation G.114 end-to-end delays below 200 ms are not considered to reduce conversational quality, whereas end-to-end delays above 400 ms are considered to result in an unacceptable conversational quality due to reduced interactivity. In view of this recommendation, threshold value THR1 could be set for example to 400 ms and threshold value THR2 could be set for example to 800 ms. Furthermore, the limits for the late loss rate could be set for example to LLR1=0% and LLR2=1.5%.

The second, higher limit LLR2, however, could also be computed by the control component 116 as a function of the received estimated response time $T_{resp}$. That is, a higher limit LLR2 is used for a higher estimated response time $T_{resp}$, thus accepting a higher loss rate for achieving a better interactivity.

When the control component 116 receives the estimated response time $T_{resp}$, it first determines whether the response time $T_{resp}$ lies below threshold value THR1 (step 401).

If the response time $T_{resp}$ is below threshold value THR1, the control component 116 selects a scaling value, which is suited to keep the late loss rate below the predetermined threshold limit LLR1 (step 402). Note that since the response time includes the buffering time, the scaling operation will change the value of the response time. To take account of this correlation, the response time estimate $T_{resp}$ may be initialized in the beginning of a received talk spurt, and be updated on each scaling operation.

When the estimated response time $T_{resp}$ lies above threshold value THR1 but below threshold value THR2 (step 403), the control component 116 selects a scaling value, which is suited to keep the late loss rate below the predetermined threshold limit LLR2 (step 405).

Alternatively, the control component 116 could first compute the limit LLR2 for the late loss rate as a function of the estimated response time $T_{resp}$, that is, LLR2=f($T_{resp}$), when the response time is in the range THR1<$T_{resp}$<THR2. This option is indicated in FIG. 4 with dashed lines (step 404). The control component 116 then selects a scaling value, which is suited to keep the late loss rate below this computed threshold limit LLR2 (step 405).

The estimated response time $T_{resp}$ is not allowed to grow above threshold value THR2.

The scaling value selected in step 402 or in step 405 is provided in a scaling command to the adjustment component 115. The adjustment component 115 may then continue with a scaling of received frames according to the received scaling value (step 406).

The blocks of FIG. 4 could equally be viewed as sub-components of the control component 116. That is, blocks 402 and 404 could be viewed as comparators, while blocks 401, 403 and 405 could be viewed as processing components configured to perform the indicated functions.

It is to be understood that the presented operation is just a general example of a jitter buffer management that uses the response time to control the adjustment process. This approach could be varies in numerous ways.

The components 111, 122, 130 and 131 of the electronic device 110 presented in FIG. 1 could be implemented in hardware, for instance as circuitry on a chip or chipset. The entire assembly could be realized for example as an integrated circuit (IC). Alternatively, the functions could also be implemented partly or entirely in the form of a computer program code.

Figure 5:
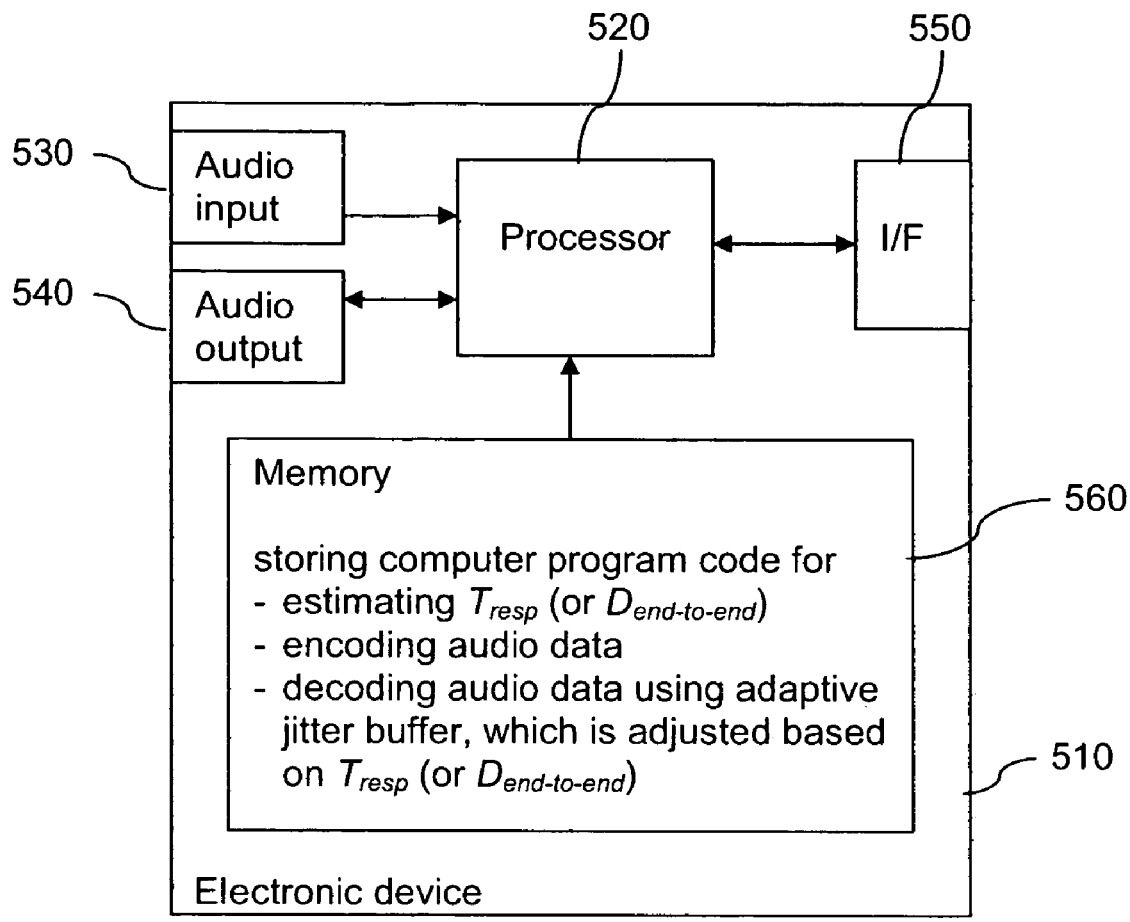
FIG. 5 is a schematic block diagram of an electronic device according to another embodiment of the invention.

FIG. 5 is a block diagram presenting details of a further exemplary embodiment of an electronic device according to the invention, in which the functions are implemented by a computer program code.

The electronic device 510 comprises a processor 520 and, linked to this processor 520, an audio input component 530, an audio output component 540, an interface 550 and a memory 560. The audio input component 530 could comprise for example a microphone. The audio output component 540 could comprise for example speakers. The interface 550 could be for example an interface to a packet switched network.

The processor 520 is configured to execute available computer program code.

The memory 560 stores various computer program code. The stored code comprises computer program code designed for encoding audio data, for decoding audio data using an adaptive jitter buffer, and for determining a response time $T_{resp}$ that is used as one input variable when adjusting the jitter buffer.

The processor 520 may retrieve this code from the memory 560, when a VoIP session has been established, and it may execute the code for realizing an encoding and decoding operation, which includes for example the operations described with reference to FIGS. 3 and 4.

It is to be understood that the same processor 520 could execute in addition computer program codes realizing other functions of the electronic device 110.

While the exemplary embodiments of FIGS. 1 to 5 have been described for the alternative of using an estimated response time $T_{resp}$ as a parameter in adjusting a jitter buffering, it is to be understood that a similar approach could be used as well for the alternative of using a one-directional end-to-end delay $D_{end\_to\_end}$ as a parameter. In FIG. 1, the response time estimation component 130 would then be an end-to-end delay estimation component. It could measure or estimate the one-way delay for instance using the NTP based approach mentioned above. The process of FIG. 4 could be used exactly as presented for the response time, simply by substituting the estimated end-to-end delay $D_{end\_to\_end}$ for the estimated response time $T_{resp}$, which is also indicated in brackets as an option in FIG. 4. The selected threshold values THR1 and THR2 would have to be set accordingly. Also in the embodiment of FIG. 5, the option of using a one-directional end-to-end delay $D_{end\_to\_end}$ instead of the response time $T_{resp}$ has been indicated in brackets.

The functions illustrated by the control component 116 of FIG. 1 or by the computer program code of FIG. 5 could equally be viewed as means for determining at a first device a desired amount of adjustment of a jitter buffer using as a parameter an estimated delay, the delay comprising at least an end-to-end delay in at least one direction in a conversation, for which conversation speech signals are transmitted in packets between the first device and a second device via a packet switched network. The functions illustrated by the adjustement component 115 of FIG. 1 or by the computer program code of FIG. 5 could equally be viewed as means for performing an adjustment of the jitter buffer based on the determined amount of adjustment. The functions illustrated by the $T_{resp}$ estimation component 130 of FIG. 1 or by the computer program code of FIG. 5 could equally be viewed as means for estimating the delay.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
    determining at a first device a desired amount of adjustment of a jitter buffer using as a parameter an estimated delay, said delay comprising at least an end-to-end delay in at least one direction in a conversation, for which conversation speech signals are transmitted in packets between said first device and a second device via a packet switched network, wherein determining an amount of adjustment comprises:
    determining said amount such that an amount of frames arriving at said first device after a scheduled decoding time is kept below a first limit, as long as said estimated delay lies below a first threshold value; and
    determining said amount such that an amount of frames arriving at said first device after a scheduled decoding time is kept below a second limit, when said estimated delay exceeds said first threshold value and
    performing an adjustment of said jitter buffer based on said determined amount of adjustment.

2. The method according to claim 1, wherein said estimated delay is an estimated response time in a conversation, said estimated response time being a time between an end of a segment of speech originating from a user of said first device and a beginning of a presentation by said first device of a segment of speech originating from a user of said second device.

3. The method according to claim 2, further comprising estimating said response time, wherein said response time is estimated taking account of the general structure of a conversation.

4. The method according to claim 1, further comprising determining said second limit as a function of said estimated delay.

5. The method according to claim 1, further comprising estimating said delay.

6. The method according to claim 2, further comprising estimating said response time, wherein said response time is estimated as a period between:
    a time when a user of said first device is detected at said first device to switch from speaking to listening; and
    a time when a user of said second device is detected at said first device to switch from listening to speaking.

7. The method according to claim 6, wherein a time when a user of said second device is detected to switch from listening to speaking is a time when said first device receives via said packet switched network a first segment of a speech signal containing active speech after having received at least one segment of said speech signal not containing active speech.

8. The method according to claim 6, wherein a time when a user of said first device is detected to switch from speaking to listening is a time when said first device starts generating comfort noise parameters.

9. The method according to claim 6, wherein a time when a user of said first device is detected to switch from speaking to listening is a time when a voice activity detection component of said first device sets a flag to a value indicating that a current segment of a speech signal that is to be transmitted via said packet switched network does not contain voice.

10. An apparatus comprising:
a control component, configured to determine at a first device a desired amount of adjustment of a jitter buffer using as a parameter an estimated delay, said delay comprising at least an end-to-end delay in at least one direction in a conversation, for which conversation speech signals are transmitted in packets between said first device and a second device via a packet switched network, wherein determining an adjustment comprises:
determining said amount such that an amount of frames arriving at said first device after a scheduled decoding time is kept below a first limit, as long as said estimated delay lies below a first threshold value; and
determining said amount such that an amount of frames arriving at said first device after a scheduled decoding time is kept below a second limit, when said estimated delay exceeds said first threshold value; and
an adjustment component configured to perform an adjustment of said jitter buffer based on said determined amount of adjustment.

11. The apparatus according to claim 10, further comprising an estimation component configured to estimate said delay.

12. The apparatus according to claim 10, wherein said estimated delay is an estimated response time in a conversation, said estimated response time being a time between an end of a segment of speech originating from a user of said first device and a beginning of a presentation by said first device of a segment of speech originating from a user of said second device.

13. The apparatus according to claim 11, wherein said control component is further configured to determine said second limit as a function of said estimated delay.

14. An electronic device comprising:
an apparatus according to claim 10;
an audio input component in operative engagement with said apparatus; and
an audio output component in operative engagement with said apparatus.

15. A system comprising:
a first electronic device according to claim 14; and
a second electronic device in operative engagement with said first electronic device, said second electronic device configured to exchange speech signals for a conversation with said first electronic device via a packet switched network.

16. The apparatus according to claim 12, further comprising a response time estimation component configured to estimate said response time taking account of the general structure of a conversation.

17. The apparatus according to claim 12, further comprising a response time estimation component configured to estimate said response time as a period between:
a time when a user of said first device is detected at said first device to switch from speaking to listening; and
a time when a user of said second device is detected at said first device to switch from listening to speaking.

18. The apparatus according to claim 17, wherein said response time estimation component is configured to estimate a time when a user of said second device is detected to switch from listening to speaking as a time when said first device receives via said packet switched network a first segment of a speech signal containing active speech after having received at least one segment of said speech signal not containing active speech.

19. The apparatus according to claim 18, further comprising a decoder configured to indicate to said response time estimation component when it receives a first segment of a speech signal containing active speech after having received at least one segment of said speech signal not containing active speech.

20. The apparatus according to claim 17, wherein said response time estimation component is configured to estimate a time when a user of said first device is detected to switch from speaking to listening as a time when said first device starts generating comfort noise parameters.

21. The apparatus according to claim 20, further comprising an encoder configured to indicate to said response time estimation component when it starts generating comfort noise parameters.

22. The apparatus according to claim 17, wherein said response time estimation component is configured to estimate a time when a user of said first device is detected to switch from speaking to listening as a time when a voice activity detection component of said first device sets a flag to a value indicating that a current segment of a speech signal that is to be transmitted via said packet switched network does not contain voice.

23. The apparatus according to claim 22, further comprising said voice activity detection component.

24. A computer program product in which a program code is stored in a computer readable medium, said program code realizing the following when executed by a processor:
determining at a first device a desired amount of adjustment of a jitter buffer using as a parameter an estimated delay, said delay comprising at least an end-to-end delay in at least one direction in a conversation, for which conversation speech signals are transmitted in packets between said first device and a second device via a packet switched network, wherein determining an amount of adjustment comprises:
determining said amount such that an amount of frames arriving at said first device after a scheduled decoding time is kept below a first limit, as long as said estimated delay lies below a first threshold value; and
determining said amount such that an amount of frames arriving at said first device after a scheduled decoding time is kept below a second limit, when the delay exceeds said first threshold value; and
performing an adjustment of said jitter buffer based on said determined amount of adjustment.

25. The computer program product according to claim 24, wherein said estimated delay is an estimated response time in a conversation, said estimated response time being a time between an end of a segment of speech originating from a user of said first device and a beginning of a presentation by said first device of a segment of speech originating from a user of said second device.

26. The computer program product according to claim 25, wherein said computer program code is further designed to realize the following:
estimating said response time taking account of the general structure of a conversation.

27. The computer program product according to claim 25, wherein said computer program code is further designed to realize the following:
estimating said response time, wherein said response time is estimated as a period between a time when a user of said first device is detected at said first device to switch from speaking to listening and a time when a user of said second device is detected at said first device to switch from listening to speaking.

28. The computer program product according to claim 27, wherein a time when a user of said second device is detected to switch from listening to speaking is a time when said first device receives via said packet switched network a first segment of a speech signal containing active speech after having received at least one segment of said speech signal not containing active speech.

29. The computer program product according to claim 24, wherein said computer program code is further designed to realize the following:
   determining said second limit as a function of said estimated delay.

30. The computer program product according to claim 24, wherein said computer program code is further designed to realize the following:
   estimating said delay.

31. The computer program product according to claim 27, wherein a time when a user of said first device is detected to switch from speaking to listening is a time when said first device starts generating comfort noise parameters.

32. The computer program product according to claim 27, wherein a time when a user of said first device is detected to switch from speaking to listening is a time when a voice activity detection component of said first device sets a flag to a value indicating that a current segment of a speech signal that is to be transmitted via said packet switched network does not contain voice.

33. An apparatus comprising:
   means for determining at a first device a desired amount of adjustment of a jitter buffer using as a parameter an estimated delay, said delay comprising at least an end-to-end delay in at least one direction in a conversation, for which conversation speech signals are transmitted in packets between said first device and a second device via a packet switched network, wherein determining an adjustment comprises:
   determining said amount such that an amount of frames arriving at said first device after a scheduled decoding time is kept below a first limit, as long as said estimated delay lies below a first threshold value; and
   determining said amount such that an amount of frames arriving at said first device after a scheduled decoding time is kept below a second limit, when said estimated delay exceeds said first threshold value; and
   means for performing an adjustment of said jitter buffer based on said determined amount of adjustment.

34. The apparatus according to claim 33, wherein said estimated delay is an estimated response time in a conversation, said estimated response time being a time between an end of a segment of speech originating from a user of said first device and a beginning of a presentation by said first device of a segment of speech originating from a user of said second device.

35. The apparatus according to claim 33, further comprising means for estimating said delay.

36. A method comprising:
   determining at a first device a desired amount of adjustment of a jitter buffer using as a parameter an estimated response time in a conversation, for which conversation speech signals are transmitted in packets between said first device and a second device via a packet switched network; and
   performing an adjustment of said jitter buffer based on said determined amount of adjustment,
   wherein said response time is estimated as a period between a time when a user of said first device is detected at said first device to switch from speaking to listening and a time when a user of said second device is detected at said first device to switch from listening to speaking.

37. The method according to claim 36, wherein a time when a user of said first device is detected to switch from speaking to listening is a time when a voice activity detection component of said first device sets a flag to a value indicating that a current segment of a speech signal that is to be transmitted via said packet switched network does not contain voice.

38. The method according to claim 36, wherein a time when a user of said first device is detected to switch from speaking to listening is a time when said first device starts generating comfort noise parameters.

39. The method according to claim 36, wherein a time when a user of said second device is detected to switch from listening to speaking is a time when said first device receives via said packet switched network a first segment of a speech signal containing active speech after having received at least one segment of said speech signal not containing active speech.

40. The method according to claim 36, wherein determining an amount of adjustment comprises:
   determining said amount such that an amount of frames arriving at said first device after a scheduled decoding time is kept below a first limit, as long as said estimated response time lies below a first threshold value; and
   determining said amount such that an amount of frames arriving at said first device after a scheduled decoding time is kept below a second limit, when said estimated response time exceeds said first threshold value.

41. The method according to claim 40, further comprising determining said second limit as a function of said estimated response time.

42. The method according to claim 36, further comprising estimating said response time.

43. An apparatus comprising:
   a control component, configured to determine at a first device a desired amount of adjustment of a jitter buffer using as a parameter an estimated response time in a conversation, for which conversation speech signals are transmitted in packets between said first device and a second device via a packet switched network; and
   an adjustment component configured to perform an adjustment of said jitter buffer based on said determined amount of adjustment,
   wherein said response time is estimated as a period between a time when a user of said first device is detected at said first device to switch from speaking to listening and a time when a user of said second device is detected at said first device to switch from listening to speaking.

44. The apparatus according to claim 43, wherein said response time estimation component is configured to estimate a time when a user of said first device is detected to switch from speaking to listening as a time when a voice activity detection component of said first device sets a flag to a value indicating that a current segment of a speech signal that is to be transmitted via said packet switched network does not contain voice.

45. The apparatus according to claim 44, further comprising said voice activity detection component.

46. The apparatus according to claim 43, further comprising an encoder configured to indicate to said response time estimation component when it starts generating comfort noise parameters.

47. The apparatus according to claim 43, wherein said a control component is configured to determine an amount of adjustment by:
   determining said amount such that an amount of frames arriving at said first device after a scheduled decoding time is kept below a first limit, as long as said estimated response time lies below a first threshold value; and
   determining said amount such that an amount of frames arriving at said first device after a scheduled decoding time is kept below a second limit, when said estimated response time exceeds said first threshold value.

48. The apparatus according to claim 47, wherein said control component is further configured to determine said second limit as a function of said estimated response time.

49. The apparatus according to claim 43, further comprising an estimation component configured to estimate said response time.

50. The apparatus according to claim 43, wherein said response time estimation component is configured to estimate a time when a user of said second device is detected to switch from listening to speaking as a time when said first device receives via said packet switched network a first segment of a speech signal containing active speech after having received at least one segment of said speech signal not containing active speech.

51. The apparatus according to claim 43, further comprising a decoder configured to indicate to said response time estimation component when it receives a first segment of a speech signal containing active speech after having received at least one segment of said speech signal not containing active speech.

52. The apparatus according to claim 43, wherein said response time estimation component is configured to estimate a time when a user of said first device is detected to switch from speaking to listening as a time when said first device starts generating comfort noise parameters.

53. A computer program product in which a program code is stored in a computer readable medium, said program code realizing the following when executed by a processor:
   determining at a first device a desired amount of adjustment of a jitter buffer using as a parameter an estimated response time in a conversation, for which conversation speech signals are transmitted in packets between said first device and a second device via a packet switched network; and
   performing an adjustment of said jitter buffer based on said determined amount of adjustment,
wherein said response time is estimated as a period between a time when a user of said first device is detected at said first device to switch from speaking to listening and a time when a user of said second device is detected at said first device to switch from listening to speaking.

54. The computer program product according to claim 53, wherein a time when a user of said first device is detected to switch from speaking to listening is a time when a voice activity detection component of said first device sets a flag to a value indicating that a current segment of a speech signal that is to be transmitted via said packet switched network does not contain voice.

55. The computer program product according to claim 53, wherein a time when a user of said first device is detected to switch from speaking to listening is a time when said first device starts generating comfort noise parameters.

56. The computer program product according to claim 53, wherein a time when a user of said second device is detected to switch from listening to speaking is a time when said first device receives via said packet switched network a first segment of a speech signal containing active speech after having received at least one segment of said speech signal not containing active speech.

57. The computer program product according to claim 53, wherein determining an amount of adjustment comprises:
   determining said amount such that an amount of frames arriving at said first device after a scheduled decoding time is kept below a first limit, as long as said estimated response time lies below a first threshold value; and
   determining said amount such that an amount of frames arriving at said first device after a scheduled decoding time is kept below a second limit, when said estimated response time exceeds said first threshold value.

58. The computer program product according to claim 57, wherein said computer program code is further designed to realize the following:
   determining said second limit as a function of said estimated response time.

59. The computer program product according to claim 53, wherein said computer program code is further designed to realize the following:
   estimating said response time.

* * * * *